UNITED STATES PATENT OFFICE.

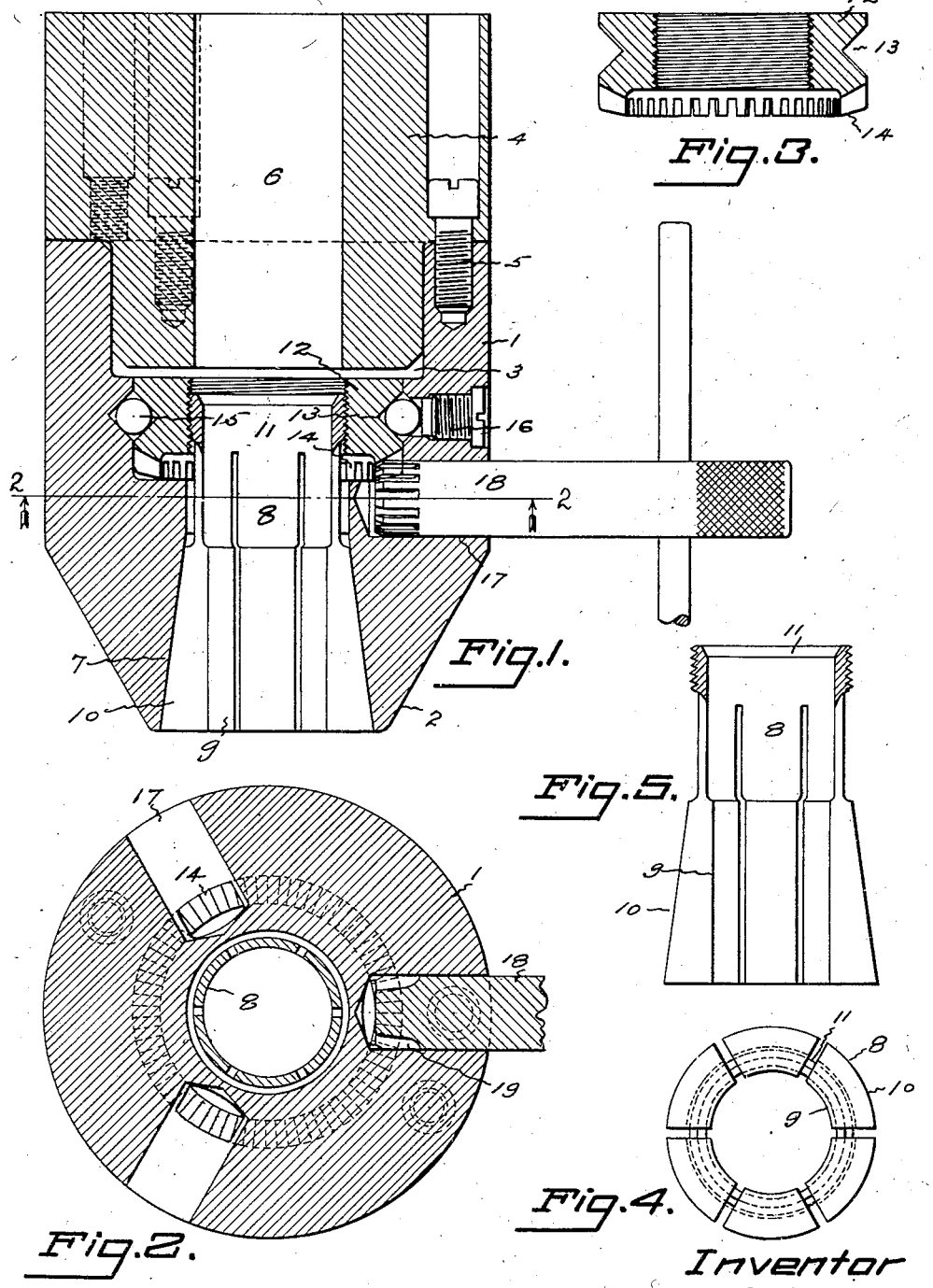

DONALD H. LAPOINTE, OF HARTFORD, CONNECTICUT, ASSIGNOR TO THE HARTFORD SPECIAL MACHINERY COMPANY, OF HARTFORD, CONNECTICUT, A CORPORATION OF CONNECTICUT.

CHUCK.

1,370,598.  Specification of Letters Patent.  Patented Mar. 8, 1921.

Application filed September 12, 1919. Serial No. 323,303.

*To all whom it may concern:*

Be it known that I, DONALD H. LAPOINTE, a citizen of the United States, residing at Hartford, in the county of Hartford and State of Connecticut, have invented a new and useful Improvement in Chucks, of which the following is a specification.

This invention relates to the construction of a chuck of the collet type, that is, a chuck in which the holding jaws are formed from a single piece of hardened spring metal and which are closed by drawing the jaws inward against the tapering wall of an opening in the body of the chuck and which spring open under their natural resilience when the collet is pushed outward.

The object of the invention is to provide a strong and substantial chuck of this character adapted to be attached to the arbor or spindle of a drill press, lathe, milling machine, screw machine or the like machine tool, having but few parts, which parts can be cheaply manufactured and assembled for use and which can be easily manipulated to hold short pieces or long bars of stock accurately and firmly.

Figure 1 of the accompanying drawings shows a central longitudinal section of the chuck. Fig. 2 shows a transverse section on the plane indicated by the dotted line 2—2 on Fig. 1. Fig. 3 shows a section of the jaw collet advancing and retracting ring. Fig. 4 shows an end view of the collet. Fig. 5 shows a section of the collet.

The cylindrical body 1 of the chuck is desirably formed of machine steel with a tapering nose 2 and a recess 3 in the base for receiving a portion of the flanged sleeve 4 which is secured to the body by screws 5 that pass through the flange of the sleeve into the body. This sleeve which may be made of cast iron has a central opening 6 designed to be fitted onto the arbor or spindle of the machine with which the chuck is to be used. In the nose end of the body is a conical recess 7 and in this recess the jaw collet 8 is fitted. A six jaw collet of tool steel is illustrated, the inner edges 9 of the jaws of which are substantially parallel with the axis of the chuck and the outer edges 10 are oblique to the axis of the chuck so that they will fit the inclined wall of the collet recess in the body. The jaws at their base are connected by a band 11, the outer surface of which is threaded. When the collet is drawn inward the jaws are contracted toward each other by contact with the tapering wall of the collet recess in the body, and when the collet is pushed outward the jaws spring apart owing to the resilience of the metal of which they are formed.

Located in a recess near the middle of the body is a ring 12, the interior of which is provided with a thread that fits the thread on the base of the collet. Around the periphery of this ring is a groove 13 and on the face of the ring are beveled gear teeth 14. The ring is held in position in the body so that it may rotate but will have no longitudinal movement, by means of balls 15, portions of which extend into the groove in the ring while other portions extend into the groove in the wall of the opening in the body about the ring. These ring-locking balls which sustain all the lateral thrusts of the ring in both directions also provide a bearing for the ring so that it will rotate easily. The balls may be placed in position through an opening in the body which is closed by a screw plug 16. Key openings 17 are made at various localities in the body in front of the ring. These openings are of such a size that they will receive the end of a key 18 which is provided with beveled teeth 19 adapted to mesh with the teeth on the face of the ring.

The key may be inserted in the most convenient opening and engaged with the teeth of the ring. Then by turning the key the ring may be rotated, and according to the direction of the turning of the key and rotation of the ring, through the intermeshing threads of the ring and collet, the jaws are drawn inward so as to be contracted or are pushed outward so that they will open.

The invention claimed is:—

1. A chuck comprising a body having a longitudinal central opening with a tapering wall at the front end, a cylindrical chamber open to the rear end and constituting throughout its length an enlargement of the central opening, an annular ball groove in the peripheral wall of the chamber and a radial key socket open to said chamber, a collet having tapering jaws conforming to the tapering opening in the body and an exterior thread on its inner end located in the central opening, a ring fitting said cylindrical chamber in the body and having an interior thread engaging the thread on the exterior of the collet, an annular groove in its exterior wall opposite the threaded section and gear teeth on its front face, said teeth extending into the key socket in the body, balls located in the space formed by the groove in the ring and groove in the body for supporting the ring and preventing endwise movement thereof with relation to the body and a removable key adapted to fit the walls of the key socket in the body and having teeth shaped to engage the teeth on the ring.

2. A collet chuck comprising a body having a tapering opening in its front end and a cylindrical chamber open throughout its entire area back of and larger in diameter than said tapering opening with which it communicates, said chamber having a V-shaped groove around its peripheral wall, a rotatory ring substantially filling said chamber, said ring having teeth on its front face, threads on its inner wall and a V-shaped groove around its periphery, balls located in the space formed by the grooves in the body and ring and holding the ring against longitudinal displacement, means for rotating said ring, and a collet with a tapering section fitting the tapering opening in the body and a threaded section fitting the threaded opening in the ring.

DONALD H. LAPOINTE.